United States Patent [19]

Gilbert et al.

[11] 4,330,652

[45] May 18, 1982

[54] PROCESS FOR POLYMERIZING PROPYLENE WITH AN IMPROVED TITANIUM CHLORIDE CATALYST

[75] Inventors: Ronald E. Gilbert; Rajindar K. Kochhar, both of Katy, Tex.

[73] Assignee: Gulf Oil Corporation, Pittsburgh, Pa.

[21] Appl. No.: 168,835

[22] Filed: Jul. 10, 1980

Related U.S. Application Data

[62] Division of Ser. No. 112,026, Jan. 14, 1980, Pat. No. 4,251,389.

[51] Int. Cl.$^3$ .......................... C08F 4/64; C08F 10/06
[52] U.S. Cl. .................................. 526/138; 526/139; 526/140; 526/141; 526/142; 526/143; 526/351
[58] Field of Search ....................... 526/138, 139–143, 526/159

[56] References Cited

U.S. PATENT DOCUMENTS

| | | | |
|---|---|---|---|
| 3,825,524 | 7/1974 | Wada et al. | 526/141 |
| 4,208,497 | 6/1980 | Bronstert et al. | 526/138 |
| 4,282,341 | 8/1981 | Klaener et al. | 526/138 |

FOREIGN PATENT DOCUMENTS 980264  1/1965  United Kingdom ............... 526/138

OTHER PUBLICATIONS

Roff et al., Crystallin Olefin Polymers, Interscience Pub., N.Y. vol. XX, Part I, p. 371 (1965).

*Primary Examiner*—Edward J. Smith
*Attorney, Agent, or Firm*—Richard L. Kelly

[57] ABSTRACT

Propylene is polymerized with an improved titanium chloride catalyst. The improved titanium chloride catalyst is prepared by treating TiCl$_4$ with an aluminum alkyl and treating the resulting titanium chloride catalyst with carbon dioxide and a Lewis base, such as di(n-butyl) ether in a hydrocarbon medium at an elevated temperature.

4 Claims, No Drawings

PROCESS FOR POLYMERIZING PROPYLENE WITH AN IMPROVED TITANIUM CHLORIDE CATALYST

This is a division of application Ser. No. 112,026 filed Jan. 14, 1980, now U.S. Pat. No. 4,251,389.

BACKGROUND OF THE INVENTION

Stereospecific propylene polymers are customarily prepared by contacting propylene monomer with a binary catalyst system. The one component of the catalyst system is a titanium chloride with the second component being an aluminum alkyl. The yield of the polymer obtained per unit of titanium in the catalyst and the ratio of the isotactic polymer to the atactic polymer is importantly influenced by the specific composition of the titanium chloride catalyst and the manner in which it is prepared.

The most productive titanium chloride catalysts and those which give the highest proportions of isotactic to atactic propylene polymer are prepared by preparing the titanium chloride catalyst by treating titanium tetrachloride with an aluminum alkyl compound such as diethyl aluminum chloride (DEAC). It is recognized in the art that the performance of such titanium chloride catalysts can be improved by subsequently treating the titanium chloride catalysts by various methods. One of the treatment methods suggested in the prior art is to heat the titanium chloride catalyst in a hydrocarbon medium with a Lewis base such as dibutyl ether.

Notwithstanding the best techniques reported in the prior art, the productivity of titanium chloride catalysts in terms of grams of propylene polymer produced per gram of titanium is significantly lower than the yield that can be obtained with similar catalysts in the production of ethylene polymers. As a consequence, there is a need in the art for titanium chloride catalysts having a higher productivity for the production of propylene polymers.

SUMMARY OF THE INVENTION

The applicant has discovered that the productivity of a titanium chloride catalyst to polymerize propylene can be enhanced by a process in which titanium tetrachloride is reduced to a lower valence state with an aluminum alkyl compound, and the resulting titanium chloride product subsequently is treated with both a Lewis base and carbon dioxide in a hydrocarbon medium at elevated temperature.

DETAILED DESCRIPTION OF THE INVENTION

The titanium chloride catalyst employed in the practice of the invention is prepared by reducing $TiCl_4$ with an aluminum alkyl compound by methods known and reported in the art. For a detailed description of the methods employed to prepare such titanium chloride catalysts, see British Pat. No. 1,391,068, U.S. Pat. No. 4,062,804, and U.S. Pat. No. 4,085,064.

In preparing the titanium chloride catalyst, anhydrous $TiCl_4$ of high purity is dissolved in an anhydrous liquid hydrocarbon, such as heptane or octane, to provide a solution containing typically 10-15 weight % $TiCl_4$. The hydrocarbon employed in the reaction will be of a high purity which has been carefully treated to exclude therefrom water, air, and polar compounds. Standard precautions will be employed to exclude air and moisture from the system. Ordinarily, all of the subsequent reaction steps will be carried out under a blanket of an inert gas such as nitrogen or argon. The $TiCl_4$ solution is cooled to about 0° C., and in some cases somewhat lower, and a solution of an alkyl aluminum compound, typically diethyl aluminum chloride (DEAC), is added dropwise with stirring. The alkyl aluminum compound reduces the $TiCl_4$ to a lower valence state which is insoluble in the hydrocarbon medium. The precipitate formed is believed to consist principally of $TiCl_3$. After the addition of the aluminum alkyl is completed, the slurry is stirred for a period of time at the prevailing reaction temperature employed to assure completion of the reduction. The temperature of the slurry then is permitted to increase to ambient temperature and stirring is continued for an additional period of time.

The aluminum alkyl employed to reduce the $TiCl_4$ may be any of the aluminum alkyl compounds used for this purpose in the prior art. Specifically, the aluminum alkyl can be a trialkyl aluminum compound, such as triethyl aluminum (TEA) or triisobutyl aluminum (TIBA), a mono- or dialkyl aluminum hydride such as ethyl aluminum dihydride (EADH), or diethyl aluminum hydride (DEAH), or a mono- or dialkyl aluminum halide such as diethyl aluminum chloride (DEAC), or ethyl aluminum dichloride (EADC). Mixtures of the above aluminum alkyls can be employed. The preferred aluminum alkyls for use in the practice of the invention are DEAC or a mixture of DEAC and EADC. A substantially equal molar mixture of DEAC and EADC is referred to in the art as ethyl aluminum sesquichloride (EASC) and is particularly well suited for use in the invention. The aluminum alkyl will be employed as a solution in a suitable liquid hydrocarbon. Typically, such solutions will contain approximately 25 weight % of the alkyl aluminum compound.

The quantity of aluminum alkyl employed to reduce the $TiCl_4$ will be somewhat dependent upon the specific aluminum alkyl employed for this purpose. It is reported in the literature that 1 mol of $TiCl_4$ can be reduced to $TiCl_3$ with $\frac{1}{3}$ mol of trialkyl aluminum, with $\frac{1}{2}$ mole of a dialkyl aluminum compound, and with 1 mol of a monoalkyl aluminum compound. It is preferred to employ at least stoichiometric quantities of the aluminum alkyl compound, and frequently the aluminum alkyl compound will be employed in at least slight excess over that stoichiometrically required.

After the titanium chloride catalyst has been prepared as described above, it will be washed with several aliquots of hydrocarbon until the hydrocarbon wash liquid gives a negative test for chloride ions. The titanium chloride catalyst then can be recovered from the hydrocarbon, dried, and stored for future use. Alternatively, the final slurry can be used immediately as such in the next step in the process.

A slurry of the titanium chloride catalyst, as prepared above, is prepared to contain a solids level that is easily stirred. Typically, the slurry will be prepared to contain 10-30 parts by weight of the titanium chloride in 100 parts by volume of the hydrocarbon. A Lewis base, typically an ether such as di(n-butyl) ether, is added to the slurry in an amount equivalent to approximately 1 mol of the Lewis base for each mol of titanium contained in the slurry. The slurry then is heated to elevated temperature, the order of 10°-150° C. and preferably 60°-90° C. While the slurry is being thus heated in the presence of the Lewis base, high purity carbon dioxide gas will be bubbled through the reaction medium. The precise role played by the carbon dioxide has not been established, but the data subsequently presented unequivocally establish that it plays a functional role above and beyond serving merely as an inert gas which excludes air and moisture from the reaction system. The carbon dioxide is bubbled through the system for a period of several minutes, and preferably substantially through the entire period in which the titanium catalyst is being treated with the Lewis base.

The Lewis base employed in this portion of the process can be any of those reported in the literature as being useful in improving the catalytic efficiency of the $TiCl_3$ catalyst. For a listing of suitable Lewis bases, see British Pat. No. 1,391,068. Among the Lewis bases reported as being useful for this purpose are compounds containing oxygen, sulfur, nitrogen, phosphorus, antimony, or arsenic. Suitable Lewis bases include within their structure functional groups such as ethers, thioethers, thiols, phosphines, stibines, arsines, amines, ketones, and esters. The preferred Lewis bases for the use in the present invention are ethers and particularly dialkyl ethers such as di(n-butyl) ether, diisoamyl ethers, and the like.

The following examples are set forth to illustrate the principle and practice of the invention to those skilled in the art. Where parts or percentages are mentioned, they are parts or percentages on a weight basis, unless otherwise noted.

As it is well recognized in the art, minor impurities in reagents and solvents employed to prepare titanium chloride catalysts can have very significant effects upon the yields of the polymer obtained per unit weight of the titanium chloride catalyst. For this reason, unless otherwise noted, in the subsequent examples, control runs were made for each example for comparison purposes. Each of the controls was prepared from the identical reagents employed to prepare the catalyst falling within the invention. This method of reporting the data minimizes erratic results which otherwise might occur from using reagents from multiple sources.

All polymerization data, except the one described in Example 8, were obtained by a standard procedure in which a glass reactor fitted with a stirrer was charged with (1) 0.5 gram of the titanium catalyst slurried in 50 ml of heptane, (2) 6 ml of a 25% of diethyl aluminum chloride (DEAC) in heptane, and (3) 860 ml of heptane. The reactor charge was heated to 65° C. and propylene was added to the reactor to maintain a pressure of 65 psig. After 1 hour, the reactor was cooled to 30° C. and vented. The polymer was recovered and dried in air. The polymer yield data are expressed as grams of polymer/gram of titanium catalyst/hour. Polymerization data in Example 8 were obtained in a 5-gallon stainless steel reactor at 70° C. at a propylene pressure of 83 psig and in the presence of hydrogen to give a polymer of 10.1 melt index. The latter was determined in accordance with ASTM D 1238-73L.

To determine the isotactic/atactic ratio of the polymer, the polymer was extracted for 7 hours with boiling heptane in a Soxhelet apparatus. The heptane insoluble fraction is defined as:

$$\frac{W_2 \times 100}{W_1}$$

where $W_1$ is the weight before extraction and $W_2$ is the weight after extraction.

EXAMPLE 1

Part A

A suitable glass flask equipped with a stirrer was charged with 60 ml of dried and deareated heptane and 77.7 grams (409 mmoles) of $TiCl_4$. The reactor was blanketed with purified nitrogen gas throughout the remainder of the procedural steps. The solution was cooled to 0° C. and a 25% heptane solution of ethyl aluminum sesquichloride (EASC), containing 367 mmoles of diethyl aluminum chloride, was added dropwise over a period of 7.5 hours. The mixture was stirred for an additional 11 hours with the coolant removed from the flask. The reaction liquid was removed by decantation and the insoluble titanium chloride product was washed repeatedly with heptane until the washings were free of chlorides. The solids were given a final wash with hexane. A yield of 100 grams of product was obtained in the form of a red-purple, free-flowing powder. The product analyzed 19.16% titanium and 6.27% aluminum.

Part B

A suitable stirred glass reactor was charged with 12.5 grams of the titanium chloride product of Part A (equivalent to 50 mmoles $TiCl_3$) and 40 ml of dried and deareated heptane. As in Part A above, the system was blanketed with nitrogen gas. The mixture was heated with stirring to 70° C., at which time 7.5 ml of di(n-butyl)ether (DBE) was added to the reactor in a single charge. The DBE added constituted 45 mmoles which was equivalent to 0.9 mol per mol of titanium chloride. Immediately after the addition of the DBE, the nitrogen blanket within the flask was replaced with carbon dioxide gas which was bubbled through the hydrocarbon slurry. The flow of carbon dioxide through the reaction mixture was continued for a period of 80 minutes. The stirring then was discontinued and the precipitate allowed to settle to give a clear, straw-colored supernate. The liquid was decanted from the reactor and the catalyst solids then were washed with several aliquots of heptane until the wash heptane gave no test for ether. The catalyst was washed once more with heptane and dried under nitrogen to obtain 10 grams of a free-flowing, dark brown powder. The catalyst contained 22.14% Ti and 2.14% Al.

Control 1-A

An aliquot of the titanium chloride product of Part A was treated with DBE in the identical manner described in Part B above with the single exception that the reaction was run continuously under a blanket of nitrogen gas with no carbon dioxide being charged to the reactor.

Control 1-B

An aliquot of Part A was employed as a Control 1-B. The product of Example 1 and Controls 1-A and 1-B were employed to polymerize propylene using the standard method described above. The polymer yields and the heptane insoluble data are shown in Table I.

TABLE I

| Example | Polymer Yield | Heptane Insoluble Fraction |
|---|---|---|
| 1 | 164 | 96.9 |
| Control 1-A | 108 | 96.8 |
| Control 1-B | 62 | 90.5 |

EXAMPLE 2

Part A

Another 12.5 gram aliquot of the titanium chloride catalyst prepared in Example 1, Part A, was treated with DBE and carbon dioxide in essentially the same manner described in Example 1, Part B. The same lots of heptane and DBE were employed. The single difference from the procedure described in Example 1, Part B, was that the slurry was maintained under a nitrogen blanket for 20 minutes after the addition of the DBE. Carbon dioxide then was bubbled through the slurry for a period of 60 minutes. The solids were recovered from the slurry and washed with several aliquots of heptane until the washings were free of DBE.

Part B

The treated titanium chloride catalyst prepared in Part A above was employed to polymerize propylene employing the procedure previously described. The treated titanium chloride catalyst produced polypropylene in a yield of 151 grams/gram of catalyst/hour. This yield should be compared with the yield for Control 1-A shown in Table I.

EXAMPLE 3

Part A

A titanium chloride catalyst was prepared from $TiCl_4$ and EASC employing the identical procedures set forth in Example 1, Part A, with the single exception that the quantity of $TiCl_4$ was increased to an amount containing 454 mmoles of $TiCl_4$.

Part B

An aliquot of the titanium chloride catalyst prepared in Part A above in the amount of 12.5 grams (50 moles) was slurried in 40 ml of heptane having 5.85 grams (45 mmoles) of DBE dissolved therein. The slurry was heated to 80° C. over a period of 10 minutes under a nitrogen atmosphere. The slurry then was maintained at this temperature under a nitrogen atmosphere for an additional 15 minutes. The nitrogen blanket was then turned off and carbon dioxide was bubbled through the slurry for 50 minutes, while maintaining the temperature in a range of 80°–90° C. The carbon dioxide stream then was turned off and the nitrogen blanket was reestablished in the reactor. The slurry was heated for an additional 100 minutes at a temperature of about 98° C. The titanium chloride catalyst was washed and dried as previously described.

Part C

A second aliquot of a titanium chloride catalyst prepared in Part A was treated with DBE and carbon dioxide in the identical manner described in Part B above, except that the time period of the carbon dioxide treatment was reduced to 30 minutes.

Control 3

An aliquot of the titanium chloride catalyst prepared in Part A was employed as Control 3.

The polymerization data for catalysts 3-B, 3-C, and Control 3, together with the data for the heptane insoluble fractions for the three polymers, are set forth in Table II below.

TABLE II

| Example | Polymer Yield | Heptane Insoluble Fraction |
|---|---|---|
| 3-B | 159 | 96.4 |
| 3-C | 191 | 95.1 |
| Control 3 | 70 | 92.8 |

EXAMPLE 4

Part A

In this example, a titanium chloride catalyst was prepared by sequentially treating $TiCl_4$ in heptane with EADC and DEAC. The apparatus of Example 1, Part A, was charged with 43 grams (227 moles) $TiCl_4$ and 25 ml of heptane. The solution was cooled to $-5°$ C. and a 25% solution containing 7.75 grams (61 mmoles) of EADC was added over a period of 60 minutes. After stirring the slurry for an additional 30 minutes, a 25% heptane solution containing 21.6 grams (180 mmoles) of DEAC was added to the slurry over a period of 4 hours. Stirring was continued at 0° C. for 2 hours and the temperature then was raised to 15° C. Stirring was continued at this temperature for an additional 10 hours. The titanium chloride catalyst was washed and dried as previously described.

Part B

A slurry containing 10 grams of the catalyst of Part A was treated with 5.85 grams (45 mmoles) of DBE dissolved in 40 ml of heptane. After the addition of the DBE, the slurry was heated for 15 minutes at 80° C. under a nitrogen blanket, then for 35 minutes at 80° C. while bubbling carbon dioxide through the slurry, and finally for an additional 35 minutes at 98° C. under a nitrogen blanket. The product was washed and dried as previously described.

Control 4

An aliquot of the titanium chloride catalyst prepared in Part A was employed as Control 4.

The polymerization data for catalysts 4-B and Control 4, together with the data for the heptane insoluble fractions of the two polymers, are set forth in Table III below.

TABLE III

| Example | Polymer Yield | Heptane Insoluble Fraction |
|---|---|---|
| 4-B | 149 | 96.6 |
| Control 4 | 63 | 89.1 |

EXAMPLE 5

Part A

A new lot of titanium chloride was prepared employing the identical procedures described in Example 4, Part A.

Part B

A 12.5-gram aliquot of the product of Part A was treated with DBE and carbon dioxide following the identical procedures described in Example 4, Part B.

Part C

The product of Part B was suspended in a medium containing a complex of 20 mmoles of DBE and 20 mmoles of DEAC in 10 ml of heptane. The slurry was stirred for 60 minutes at a temperature of 35°–40° C. The slurry was washed with several aliquots of heptane until it gave a negative test for DBE. The product then was recovered and dried.

Control 5-A

An aliquot of the titanium chloride catalyst of Part A was slurried in heptane and carbon dioxide was bubbled through the slurry for 60 minutes at 84° C. The flow of carbon dioxide then was terminated and the slurry was heated for an additional 45 minutes at 98° C. under a nitrogen blanket. The product was washed and dried as previously described.

Control 5-B

An aliquot of the titanium chloride catalyst of Part A was employed as Control 5-B.

The polymerization data for catalyst 5-C, Control 5-A and Control 5-B, together with data for the heptane insoluble fractions for the three polymers, are set forth in Table IV.

TABLE IV

| Example | Polymer Yield | Heptane Insoluble Fraction |
|---|---|---|
| 5-C | 162 | 97.1 |
| Control 5-A | 67 | 95.7 |
| Control 5-B | 68 | 93.3 |

Example 5, Part C, was run to demonstrate that catalysts prepared by the method of the present invention, also can be further treated by methods employed in the art to improve the catalyst activity or catalyst stereospecificity. The prior art reports that the stereospecificity of $TiCl_3$ catalysts can be improved by treating the product with a complex formed between an ether and an aluminum alkyl chloride.

Control 5-A was run to demonstrate that the treatment of a titanium chloride catalyst with carbon dioxide in the absence of a Lewis base has little if any effect in improving the activity of the catalyst.

EXAMPLE 6

Part A

A titanium chloride catalyst was prepared following the general procedures of Example 1, Part A, with two modifications. First, the quantity of the EASC employed was reduced to provide the equivalent of 0.57 mmole of DEAC per mole of $TiCl_4$. Second, after the reduction had taken place, the slurry was heated for 2 hours at 80° C. The prior art teaches that such a postheating step improves the productivity and stereospecificity of the titanium chloride catalyst.

Part B

An aliquot of the titanium chloride product of Part A weighing 12.5 grams (50 mmoles) was slurried in 50 ml of heptane and heated to 75° C. DBE in the amount of 5.85 gm (45 mmoles) was added and the slurry then was heated to 80° C. for 15 minutes under a nitrogen blanket. Carbon dioxide then was bubbled through the slurry for 35 minutes at 80° C. Finally, the slurry was heated for 50 minutes at 100° C. under a nitrogen blanket. The product was washed and dried as previously described.

Control 6-A

An aliquot of the titanium chloride catalyst of Part A was treated with DBE in essentially the same manner described in part B above. The single exception was that no carbon dioxide was employed in the treatment and after the addition of the DBE, the slurry was heated for 60 minutes at 100° C. under a nitrogen blanket.

Control 6-B

An aliquot of the product of Part A was employed as Control 6-B.

The polymerization data for catalysts 6-B, Control 6-A and Control 6-B, together with data for the heptane insoluble fractions for the polymers, are set forth in Table V.

TABLE V

| Example | Polymer Yield | Heptane Insoluble Fraction |
|---|---|---|
| 6-B | 206 | 97.2 |
| Control 6-A | 139 | 97.2 |
| Control 6-B | 76 | 94.3 |

EXAMPLE 7

This example was run to demonstrate that a commercially available $TiCl_3$ catalyst produced by an aluminum alkyl reduction of $TiCl_4$ can be treated by the method of the invention to improve its performance properties. The product is reported to contain $\frac{1}{3}$ mol of $AlCl_3$ per mol of $TiCl_3$. A sample of the commercial product in the amount of 50 mmoles was slurried in 40 ml of heptane heated to 85° C. and 5.85 grams (45 mmoles) of DBE were added thereto. Carbon dioxide was bubbled through the slurry at this temperature for 45 minutes. The slurry then was heated under a nitrogen blanket for an additional 45 minutes. The product was washed with heptane until it gave a negative test for DBE and was recovered and dried in the usual manner.

Control 7

Another aliquot of the same commercial $TiCl_3$ catalyst was activated by heating for two hours in the presence of 25 mmoles of DBE in 160 ml of toluene under a blanket of nitrogen. This activation procedure was employed as it is one that is recommended for this product in the prior art.

The catalyst prepared in accordance with the invention gave a polymer yield of 107 grams of polymer per gram of catalyst per hour. By comparison, Control 7 gave a polymer yield of 71 grams of polymer per gram of catalyst per hour.

EXAMPLE 8

This example was run to illustrate the capability of the process of the invention when the catalyst is prepared without intermediate separation of products. A flask was charged with 47.5 grams (250 mmoles) of $TiCl_4$ and 50 ml of heptane. A stream of argon was continuously introduced into the reactor to provide an inert atmosphere. The reaction mixture was cooled to 0°

C. with stirring and 170 ml of a heptane solution of EASC containing an equivalent of 225 mmoles of DEAC was added dropwise over a period of 8 hours. The slurry then was stirred for two hours at 0° C., 16 hours at 20° C., 3 hours at 85° C., and 4 hours at 100° C. The supernatent liquid was withdrawn and the solids were washed with several aliquots of heptane until the wash liquid gave no test for chlorides. The solids then were slurried in 100 ml of heptane, heated to 80° C., and 40 ml (230 mmoles) of DBE were added to the slurry over a period of 225 minutes. The flow of argon was discontinued and carbon dioxide was bubbled through the slurry at a rate of 400–450 bubbles per minute for 60 minutes while maintaining a temperature of 80° C. The titanium chloride catalyst then was washed and dried as previously described. This catalyst, when used to polymerize propylene, provided a polymer yield of 486 grams of polymer per gram of catalyst per hour. The heptane insoluble fraction of the polymer was 96.6%.

As demonstrated in the examples, treatment of the titanium chloride catalyst with carbon dioxide in the presence of the Lewis base significantly improves the productivity of the catalyst in polymerizing propylene. The precise role played by the carbon dioxide has not been established, but it may function cooperatively with the Lewis base in removing from the catalyst minor components formed in the reduction reaction. While the carbon dioxide treatment is customarily run at an elevated temperature, it is believed that generally comparable results can be obtained at ambient temperature if the treatment is run over a longer period of time.

The procedures of the invention can be employed in combination with other treatments of $TiCl_3$ catalysts which are reported to improve the activity of such catalysts. One such combination treatment is illustrated in Example 5.

The catalysts of the invention can be employed to polymerize propylene by solution, slurry or vapor phase processes employing any of the polymerization techniques presently known. The titanium chloride catalyst will be employed with conventionally employed cocatalysts such as aluminum alkyls, particularly diethyl aluminum chloride (DEAC). The ratios of the titanium catalyst and cocatalyst employed will be those conventionally employed. The catalysts can be employed to prepare propylene homopolymers, as well as propylene copolymers of both the random and block type. In addition, the catalysts can be employed to polymerize ethylene and higher $\alpha$-olefin monomers, such as butene-1, by conventional procedures.

What is claimed:

1. In a process for the polymerization of propylene by contacting propylene with a titanium chloride catalyst and an aluminum alkyl cocatalyst, said titanium chloride catalyst having been prepared by treating titanium tetrachloride with an aluminum alkyl to reduce the titanium to a lower valence state and then heating the reduced titanium chloride in a liquid hydrocarbon in the presence of a Lewis base; the improvement which consists of passing carbon dioxide through the hydrocarbon medium while the reduced titanium chloride is being treated with the Lewis base, the duration of the carbon dioxide treatment being sufficient to enhance the productivity of said titanium chloride in the polymerization of propylene.

2. The process of claim 1 in which the Lewis base is an ether.

3. The process of claim 2 in which the ether is a dialkyl ether.

4. The process of claim 3 in which the ether is di(n-butyl) ether.

* * * * *